United States Patent Office 2,904,403
Patented Sept. 15, 1959

2,904,403

PREPARATION OF IF$_5$

William Channing Smith, Wilmington, Del., assignor to E. I. du Pont de Nemours and Company, Wilmington, Del., a corporation of Delaware No Drawing. Application June 7, 1957
Serial No. 664,162

5 Claims. (Cl. 23—205)

This invention relates to iodine fluorides and has as its primary object provision of a novel method of preparing such fluorides, iodine pentafluoride in particular.

Iodine pentafluoride is a versatile and well-known fluorinating agent which can be used to prepare fluorine-bearing compounds that are not readily accessible by other routes. It can be used, for example, to prepare fluorohalohydrocarbons and fluoroalkyl sulfides, to form adducts with oxides of nitrogen and to convert metals to fluorides. Iodine pentafluoride heretofore has generally been prepared on a limited scale by reaction of silver fluoride with iodine or by processes which use elemental fluorine. Such processes are difficult to operate and frequently require unusual precautions because of the corrosive nature of the reactants and the vigor of the reaction.

It has now been found that fluorides of iodine can be prepared by contacting sulfur tetrafluoride at a temperature sufficient to effect reaction with an inorganic compound comprising iodine and oxygen in which the iodine is bonded solely to oxygen. The preferred compounds contain iodine and oxygen and at most one additional element which is selected from alkali metals and alkaline earth metals. The preferred compounds are, therefore, iodine oxides, alkali metal iodates and alkaline earth metal iodates.

Examples of compounds which can be used in the process are iodine pentoxide (I$_2$O$_5$), sodium iodate, potassium periodate, magnesium iodate, calcium iodate and barium iodate. The compounds are preferably used in an anhydrous form, free of water crystallization, since water reacts with sulfur tetrafluoride and with iodine pentafluoride.

The proportions in which the reactants are used are not critical although, to obtain maximum yield of iodine pentafluoride, sulfur tetrafluoride is preferably used in excess. The molar ratio of the iodine oxide to sulfur tetrafluoride may range from 1:2 to as high as 1:20. Preferably it lies between 1:5 and 1:10. The temperature of the reaction may be as low as 0° C. and as high as 300° C.: the preferred range lies between 50° C. and 250° C. The reaction can be conducted at atmospheric pressure or even lower; the use of superatmospheric pressure is not detrimental and may, in a batch process, aid in bringing the reaction to completion. The reaction is preferably conducted under anhydrous conditions and in the absence of air or oxygen to avoid undesirable side reactions.

The time in which the reactants are in contact may vary from a few seconds, as in a continuous flow process, to as much as 24 hours in a batch process.

The reaction equipment is preferably made from material resistant to attack by active fluorine compounds, for example, platinum or stainless steel. In a batch process a vessel capable of withstanding pressure is charged with the iodine compound, cooled to about —40° C. and evacuated to a pressure of 50 mm. or less. It is then charged with sulfur tetrafluoride, sealed and heated to the desired temperature for the required time. The reactants are agitated during this period by any suitable means. The vessel is then cooled, opened and iodine pentafluoride collected and purified by conventional procedures such as distillation. When alkali or alkaline earth metal iodates are used in the process, the iodine pentafluoride may be isolated in the form of a solid complex compound with alkali or alkaline earth metal fluorides.

In a continuous process gaseous sulfur tetrafluoride is passed through a tube containing the iodine compound, preferably heated to a temperature high enough to volatilize the iodine pentafluoride as it is formed. The iodine pentafluoride is separated from the gas effluent by cooling in traps and the unreacted sulfur tetrafluoride is recycled through the reaction tube.

The following examples illustrate the process of the invention.

Example 1

(A) A bomb, lined with stainless steel and of 145 ml. capacity, was charged with 33.4 g. (0.10 mole) of iodine pentoxide, cooled in a solid carbon dioxide-acetone mixture and evacuated to 1 mm. pressure. It was charged with 66 g. (0.60 mole) of sulfur tetrafluoride, sealed and heated at 60° C. for four hours and at 120° C. for ten hours. After cooling to about 25° C. it was opened and 44 g. of crude iodine pentafluoride, a reddish-brown liquid, was removed. Distillation of the liquid yielded 27.9 g. of pure product boiling at 102–110° C.

(B) In another experiment, the bomb described above was charged with 33.4 g. (0.10 mole) of iodine pentoxide and 77 g. (0.70 mole) of sulfur tetrafluoride. A moderate temperature rise occurred on adding the sulfur tetrafluoride. The reactants were heated at 60° C. for four hours, at 120° C. for six hours and finally at 180° C. for four hours. Iodine pentafluoride was isolated as described in the preceding experiment.

(C) A borosilicate glass reaction tube, about 12 inches long and having an inner diameter of 1 inch and fitted with a thermocouple well, was charged with 66.7 g. (0.20 mole) of iodine pentoxide. The pentoxide was distributed evenly as a layer on the bottom of the tube. The reactor was flushed with nitrogen and a trap cooled in solid carbon dioxide-acetone solution was attached to the exit end. Sulfur tetrafluoride gas was passed over the oxide at 160–185° C. for 10 minutes, a total of 28 g. of the tetrafluoride being used. There was obtained 7.3 g. of crude iodine pentafluoride.

Example 2

Using the bomb and process described in Example 1, a mixture of 21.4 g. (0.10 mole) of potassium iodate (KIO$_3$) and 44 g. (0.40 mole) of sulfur tetrafluoride was heated at 60° C. for 2 hours, 120° C. for 2 hours, 140° C. for 4 hours, and 240° C. for 6 hours. The volatile products from the reaction were condensed as a light brown liquid in a trap cooled to —78° C. After warming to ambient air temperature (about 25° C.), approximately 1 ml. of brown liquid remained which was showed by nuclear magnetic resonance studies to be iodine pentafluoride (IF$_5$). There was also removed from the bomb 16.8 g. of solid product which was largely potassium hexafluoriodate, KIF$_6$.

Since obvious modifications in the invention will be apparent to those skilled in the chemical arts, I propose to be bound solely by the appended claims.

The embodiments of the invention in which an exclusive property or privilege is claimed are defined as follows:

1. The process for preparing iodine pentafluoride which comprises contacting sulfur tetrafluoride at reaction temperature with an inorganic compound containing iodine bonded solely to oxygen under substantially anhydrous conditions.

2. The process of claim 1 in which said inorganic compound is an oxide of iodine.

3. The process of claim 1 in which said inorganic compound is an iodate.

4. The process for preparing iodine pentafluoride which comprises contacting sulfur tetrafluoride at reaction temperature with iodine pentoxide under substantially anhydrous conditions.

5. The process for preparing iodine pentafluoride which comprises contacting sulfur tetrafluoride at reaction temperature with a member of the group consisting of alkali and alkaline earth metal iodates under substantially anhydrous conditions.

References Cited in the file of this patent

Mellor's Comprehensive Treatise on Inorganic and Theoretical Chemistry, Longmans, Green and Co., London, 1956, Supplement II, Part I, page 173.